United States Patent
Wagner et al.

(10) Patent No.: US 7,542,839 B2
(45) Date of Patent: Jun. 2, 2009

(54) METHOD FOR SELECTING THE OPERATING STATE OF A CRUISE CONTROL SYSTEM FOR MOTOR VEHICLES

(75) Inventors: Klaus-Peter Wagner, Weil Der Stadt (DE); Hans-Peter Schneider, Stuttgart (DE); Hermann Winner, Bietigheim (DE); Ralph Lauxmann, Korntal-Muenchingen (DE); Thilo Leinweber, Stuttgart (DE); Jens Lueder, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 821 days.

(21) Appl. No.: 10/507,667

(22) PCT Filed: Sep. 30, 2002

(86) PCT No.: PCT/DE02/03703

§ 371 (c)(1),
(2), (4) Date: Mar. 9, 2005

(87) PCT Pub. No.: WO03/078195

PCT Pub. Date: Sep. 25, 2003

(65) Prior Publication Data

US 2005/0143894 A1 Jun. 30, 2005

(30) Foreign Application Priority Data

Mar. 15, 2002 (DE) .............................. 102 11 475

(51) Int. Cl.
*B60T 8/32* (2006.01)

(52) U.S. Cl. ........................... 701/93; 701/96; 340/435; 340/438; 340/903

(58) Field of Classification Search ............... 701/1, 701/93, 96, 301; 340/435, 436, 438, 901, 340/903
See application file for complete search history.

(56) References Cited

U.S. PATENT DOCUMENTS 6,691,003 B1 * 2/2004 Stortz et al. .................... 701/1

FOREIGN PATENT DOCUMENTS

| DE | 196 14 061 | 10/1996 |
|----|-----------|---------|
| DE | 196 44 164 | 4/1998 |
| DE | 198 32 800 | 2/1999 |
| DE | 199 45 268 | 3/2001 |
| EP | 1 074 853 | 2/2001 |
| JP | 2000-046978 | 2/2000 |
| JP | 2001-063401 | 3/2001 |
| WO | 01 22113 | 3/2001 |

OTHER PUBLICATIONS

"Adaptive Cruise Control" in Automotive Electronics Handbook, Ronald K. Jurgen (ed), 2nd edition, McGraw-Hill (1999), chapter 30.1.

* cited by examiner

*Primary Examiner*—Gertrude Arthur Jeanglaud
(74) *Attorney, Agent, or Firm*—Kenyon & Kenyon LLP

(57) ABSTRACT

A method for selecting the operating state of a cruise control system for motor vehicles having a distance sensor and automatic blindness detection, in which at least one additional condition is checked for automatic shutdown of the cruise control when blindness of the distance sensor is detected, and a shutdown is performed only when this additional condition is also met.

12 Claims, 5 Drawing Sheets

METHOD FOR SELECTING THE OPERATING STATE OF A CRUISE CONTROL SYSTEM FOR MOTOR VEHICLES

RELATED APPLICATION INFORMATION

This application claims the benefit and priority of PCT/DE02/0373, which was filed on Sep. 30, 2002 and which designated the United States of America, and claims priority to and the benefit of German Patent Application No. 102 11 475.7, which was filed in Germany on Mar. 15, 2002 (both of which are incorporated in their entirety as to their disclosures).

FIELD OF THE INVENTION

The present invention relates to a method for selecting the operating state of a cruise control system for motor vehicles having a distance sensor and automatic blindness detection, and it also relates to a cruise control system for implementing this method.

BACKGROUND INFORMATION

There are cruise control systems with which the speed of the vehicle may be regulated at a desired speed selected by the driver for vehicles. In addition, the distance from a vehicle in front is measurable with the help of a distance sensor, e.g., a radar or lidar sensor. The cruise control is then adjusted to maintain a predetermined distance, which may be as a function of speed, from the vehicle traveling in front, which has been selected as the target object. Such systems are also referred to as adaptive cruise control or ACC systems.

Satisfactory functioning of an ACC system presupposes that the distance sensor is functioning faultlessly and is correctly adjusted so that vehicles traveling in front in one's own lane may be located reliably. Apart from a disturbance in function or a misadjustment of the distance sensor, environmental factors such as heavy rain or snowfall, soiling of the sensor head or the like may result in a reduction in sensor range even to the extent of the distance sensor becoming blind. In general, the function of radar sensors is less impaired than that of lidar sensors by rain or snowfall, but even with radar sensors there is the risk of the sensor being blinded in particular when the radar antenna mounted in an exposed position on the front of the vehicle becomes encrusted with snow, ice or sludge thrown up from the road. For safety reasons, it is desirable for the blindness of a distance sensor to be detected automatically and then for a shutdown of the ACC system to be triggered and an acoustic or visual warning to be output to the driver.

German patent document no. 196 44 164 A1 refers to and discusses an automotive radar system in which a dielectric body which is used for focusing the radar waves is covered with printed electric conductors which allow detection of a layer of dirt, snow or moisture that interfere with radar reception. If necessary, the interfering deposit may also be removed automatically, e.g., by electric heating or by a type of wiper. However, such monitoring and cleaning systems are relatively complex and expensive.

German patent document no. 199 45 268 discusses and refers to a method which provides for recognizing blindness of a radar sensor merely on the basis of the signals supplied by the radar sensor itself. By analyzing these signals, various indicators are formed which indicate blindness of the sensor with a relatively high reliability, depending on the driving situation. Examples of suitable indicators include the angle quality of all objects detected by the radar system, this quality describing the object's stability, i.e., the rate of detection failures of the target object selected for the regulation, the average power of the signals received by the sensor, the sum of all objects detected by the system during a measurement, the relationship between the object distance and the radar amplitude for the object detected at the greatest distance from one's own vehicle and the presence or absence of road reflection. These indicators are weighted with weighting factors which may in turn be variable, depending on the traffic situation, and a decision signal indicating whether or not the sensor is blind is obtained by comparing the resulting weighted sum of the indicators with a threshold value.

With regard to the traffic situation, a distinction between following and driving freely is relevant for detection of blindness. Following refers to a traffic situation in which a vehicle traveling directly in front is selected as a target object and is followed at an appropriated distance. In this situation, a sudden loss of the target object is an important indicator of blindness. Driving freely refers to a traffic situation in which no relevant target object is selected but instead the cruise control relies on the desired speed selected by the driver. However, even in this situation, the sensor will in general also detect other radar targets, e.g., street reflection, movable targets or stationary targets at the edge of the road, vehicles in other lanes and the like. The radar echoes of these targets may then be used for detection of blindness.

When blindness of a sensor is detected with such a system, whether driving freely or following, this results directly in shutdown of the ACC system and the driver is prompted by a takeover instruction to take control of the longitudinal movement of the vehicle himself using the accelerator pedal and brake.

SUMMARY OF THE INVENTION

An object of the exemplary embodiment and/or exemplary method of the present invention is to improve the automatic selection of the operating state of the cruise control system, in particular the choice between active and inactive states of the ACC system, so that a high availability of the ACC system and a system response that is plausible for the driver are achieved in a wide range of operating situations while appropriately taking into account the results of the blindness recognition.

This object maybe achieved according to the exemplary embodiment and/or exemplary method of the present invention with a method in which at least one additional condition is checked for the automatic shutdown of the cruise control system when a distance sensor is found to be blind and a shutdown is performed only when this additional condition is met.

The exemplary embodiment and/or exemplary method of the present invention is based on the consideration that automatic blindness detection has only a limited reliability in certain operating systems, thus potentially resulting in unjustified shutdown of the ACC system, which might seem implausible for the driver and could have a negative effect on the convenience and sense of safety of the driver. For example, when driving freely in a sparsely populated region such as a desert, it may occur that due to the lack of reflecting radar targets, blindness of the radar sensor is simulated, so that an unjustified shutdown of the ACC system is triggered. The driver must then intervene in the driving process himself apparently without a recognizable reason; this is often perceived as an inconvenience and also causes a loss of confidence in the reliability of the ACC system.

Therefore, according to the exemplary embodiment and/or exemplary method of the present invention, when blindness of the distance sensor (either real or presumed) is detected, a check is performed to determine whether there is at least one additional condition which would make shutdown of the ACC system appear plausible and necessary. Such a condition will prevail in particular when the vehicle is following another vehicle at the time when the blindness is detected. In this situation there is a high probability that the detection of blindness is an indicator of true blindness of the distance sensor, and moreover it is appropriate in this situation for safety reasons to point out to the driver as a preventive measure the possibility of a malfunction in the ACC system. In free driving, however, there is a much higher probability that blindness of the sensor is only being simulated because of the absence of suitable reflective targets, and even if there is a true case of blindness, there is no immediate risk if the cruise control is continued at the desired speed.

However, in the context of the exemplary embodiment and/or exemplary method of the present invention, conditions may also be tested which make a shutdown of the ACC function appear appropriate even when driving freely. For example, in a case when blindness of the distance sensor is detected when driving freely, it would be conceivable to check whether the car was following another vehicle within a certain period of time in the past or whether it has passed a vehicle previously traveling in front. This would indicate that there is relative activity on the road on which the vehicle travels, so that reappearance of a vehicle traveling in front in one's own lane would be expected and the driver should be informed of the presumed blindness of the distance sensor as a precautionary measure.

With a radar sensor, soiling of the sensor due to snow, sludge or ice is the most common cause of blindness, so a supplementary check could also be performed on the basis of whether or not the windshield wiper has been turned on, on the basis of an outside temperature sensor, or on the basis of traction control or wheel slip to ascertain whether true blindness of the radar sensor due to ice, snow or sludge or possibly even rain is plausible.

Advantageous embodiments of the exemplary embodiment and/or exemplary method of the present invention are described herein.

In one embodiment of the present invention, the only condition checked is whether the vehicle is following another vehicle. When driving freely, however, ACC cruise control will be continued even in the event blindness is detected. According to another embodiment of the present invention, however, the driver may be warned that the sensor might be blind by an acoustic and/or visual signal when blindness is detected when driving freely. If no such warning is provided, then of course no blindness check need be performed in the first place when driving freely.

If the ACC function has been turned off when following or because of other conditions, this usually results in deceleration of the vehicle which is definitely perceptible for the driver and on the basis of which the driver is able to recognize that the ACC has been shut down. However, it is expedient to additionally inform the driver of the shutdown by a signal (takeover instruction). If a target object is recognized after such a shutdown, the ACC may automatically resume control, because then the blinding of the distance sensor will have evidently been eliminated or there was no true blinding. In an alternative embodiment, however, the system may be designed in such a way that the ACC may only be reactivated by a driver command.

In a modified embodiment, the cruise control function may be continued at the desired speed when blindness is detected when driving freely, in which case distance monitoring is inactivated and the driver is informed of this circumstance by a signal. Again in this case, distance monitoring may be reactivated automatically on detection of a new target object or only in response to an explicit driver command.

According to another embodiment of the present invention, instead of the condition "following," a check is performed to determine whether the blindness currently detected is the first detection of blindness since beginning the trip or within a certain period of time. An initial blindness detection will then result in shutdown of the ACC system either when following or when driving freely. If the driver recognizes that he is in an environment having very little reflection and blindness detection is therefore likely to be wrong, the driver will reactivate the ACC through a corresponding command. If the blindness detection system then again displays the blinding of the sensor, the higher level control system will have "learned" that the automatic shutdown does not conform to the driver's wishes and the ACC function will be maintained for at least a limited period of time. The length of this period of time may be variable and will be selected to be longer, the more frequently the driver has reactivated the system. As an alternative, the driver may be given an opportunity to directly input a command "ignore blindness detection" which will then remain in effect until the end of the trip or until canceled by the driver. The additional condition to be checked in this case is that the "ignore blindness detection" command is not active. For safety reasons, there should be an initialization at the beginning of the trip, i.e., when turning on the ignition, which makes the "ignore blindness detection" command inactive.

DETAILED DESCRIPTION

Figure 1:
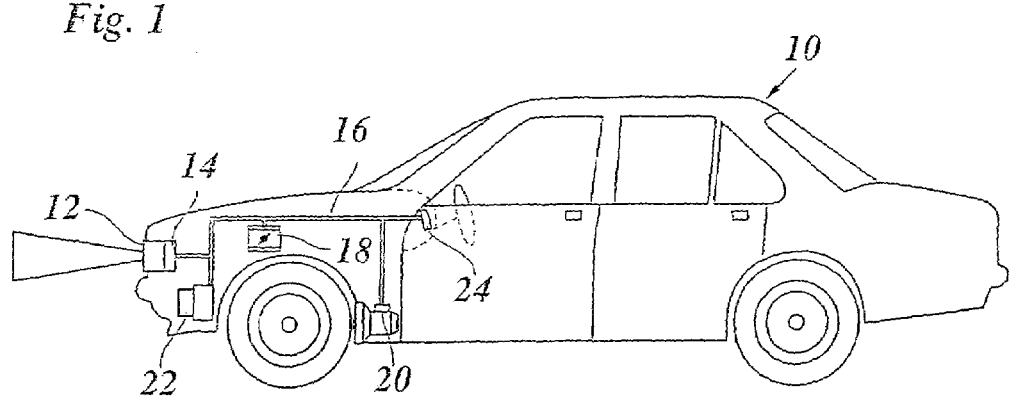
FIG. 1 shows a schematic diagram of significant components of an ACC system in a motor vehicle.

Motor vehicle 10 shown in FIG. 1 has a radar sensor mounted as a distance sensor 12 on the front section of the motor vehicle, with an ACC control unit 14 also being mounted in the sensor housing. ACC control unit 14 is connected by a databus 16 (CAN) to an electronic drive control unit 18, a transmission control unit 20, a brake system control unit 22, and control unit 24 of a man/machine interface (MMI).

With the help of a multi-beam radar, distance sensor 12 measures the distances, relative speeds and azimuth angles of objects which reflect radar waves and are situated in front of the vehicle. The raw data received at regular intervals, e.g., every 10 ms, is analyzed in ACC control unit 14 to identify and track individual objects and to recognize in particular a vehicle traveling in the same lane in front of one's own vehicle and to select it as a target object. Through commands to drive control unit 18 and brake system control unit 22, as well as commands to transmission control unit 20 in the case of vehicles having an automatic transmission, ACC control unit 14 regulates the speed of vehicle 10. The man/machine interface which is controlled by control unit 24 includes various operating and display elements on the dashboard of the vehicle and is used among other things to transmit operating commands from the driver to ACC control unit 14 and to output messages of an ACC control unit 14 to the driver. To this end, the MMI may also have a loudspeaker output for acoustic signals or for synthetic speech.

If no vehicle traveling in front is located, ACC control unit 14 regulates the speed of vehicle 10 at a desired speed selected by the driver. However, if a vehicle traveling in front is detected as a target object and its speed is lower than that of one's own vehicle, the speed of vehicle 10 is regulated to maintain an appropriate distance from the vehicle traveling in front.

The design and operation of such an ACC system are discussed, for example, in Winner: "Adaptive Cruise Control" in Automotive Electronics Handbook, Ronald K. Jurgen (ed.), $2^{nd}$ edition, McGraw-Hill (1999), chapter 30.1.

As understood from the related art, ACC control unit 14 includes self-test functions which permit a function test of the distance sensor and its analysis system with the help of suitable test signals in an initialization phase at the start of a trip. Likewise, this control unit includes test functions which permit a continuous or periodic blindness check of distance sensor 12 while driving, e.g., by analyzing the received radar signals referred to and discussed in German patent document no. 199 45 268.

Figure 2:
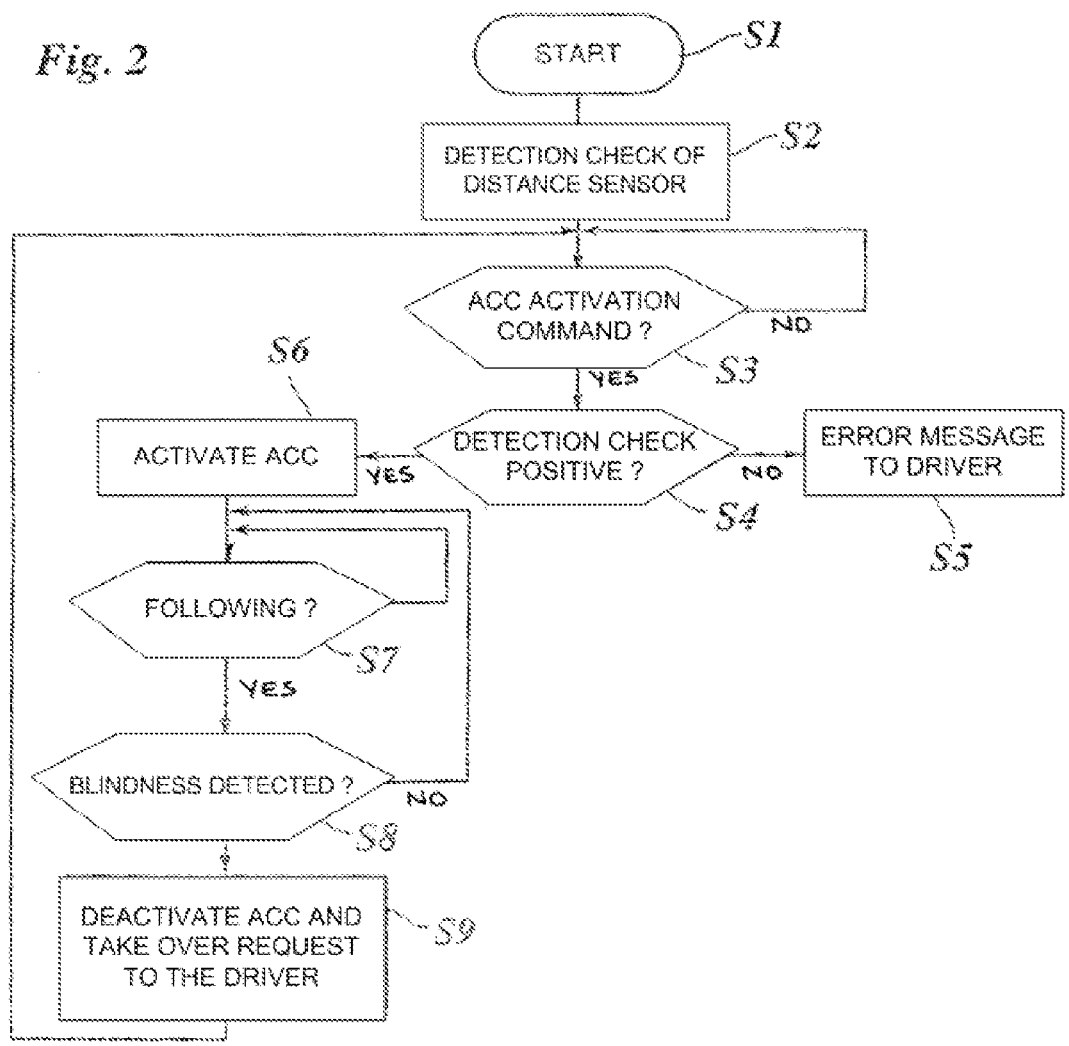
FIG. 2 shows a flow chart for an exemplary method of the present invention.

FIG. 2 shows a flow chart of a method which is also implemented in distance sensor control unit 14 and which determines how blindness detection is to be performed when driving while an ACC system is active and how this will effect the operating state of the ACC system.

After system start in step S1, immediately after turning on the ignition of the vehicle, a detection check is first performed in step S2, checking on the functional capability of distance sensor 12 according to available methods. The positive or negative outcome of this detection check is stored. If the result of the detection check is negative, an error signal may optionally be output immediately via control unit 24 and the man/machine interface. However, this is not obligatory because the vehicle is capable of being driven even without a functioning ACC system.

A check is then performed periodically in step S3 to determine whether the ACC system has been activated by a driver command. If the driver has input an activation command, the stored result of the detection check performed in step S2 is queried in step S4. If an error is found in the detection check, an error signal is again output in step S5, informing the driver that the ACC system is not usable. Otherwise, the ACC system is activated in step S6.

When the ACC system is active, signals of distance sensor 12 are analyzed, and a decision is made as to whether there is another vehicle directly in front of vehicle 10 traveling in the same lane, which is then selected as the target object. If there is such a target object, the system is in "following" mode and the distance from the vehicle in front is regulated. If no relevant target object is detected, then the system is in "free driving" mode and the speed of the vehicle is regulated at the desired speed selected by the driver.

A check is performed in step S7 to determine whether the mode is "following." If this is not the case, the system remains in free driving mode and step S7 is repeated cyclically.

Only if the system is in following mode is a blindness check of distance sensor 12 performed in step S8, e.g., on the basis of the absence or the quality of a radar echo signal from the selected target object and taking into account any radar echoes from other radar targets. If the blindness check reveals that the distance sensor has not been blinded, the routine jumps back to step S7, and steps S7 and S8 are repeated cyclically as long as the system remains in following mode. Depending on the traffic situation, one or more changes between following mode and free driving mode may occur. The blindness check is performed only in following mode each time.

If the blindness of distance sensor 12 has been recognized in step S8, then in step S9 the ACC system is deactivated and the driver receives a takeover instruction via control unit 24 and the MMI, instructing the driver that he must take over control of the vehicle himself because the ACC system has been turned off because of presumed blindness of the distance sensor. The routine then jumps back to step S3. If the driver has the sense that the blindness of the distance sensor has been overcome—e.g., because of a change in weather conditions—the driver may thus reactivate the ACC system at any time.

Since step S8 is run through only in following mode, the cruise control remains active in any case in free driving mode, so the driver is not burdened unnecessarily by the takeover instruction.

If, after a successful system shutdown in step S9, the driver reactivates the ACC system in step S3, the cruise control function will be usable again in general even if the blindness of distance sensor 12 still persists. If the sensor is blinded, it may not be possible to detect and select a relevant target object, so the query in step S7 as to whether the following mode is prevailing will have a negative outcome and therefore a blindness check will not be performed again. Of course in this case, the driver himself must watch for vehicles traveling in front.

The embodiment described here has the advantage that there is no false detection of blindness and thus no unnecessary shutdown of the ACC system in free driving in a low-reflection environment, where blindness of the distance sensor would otherwise be simulated. This is advantageous in particular for users of vehicles who frequently make trips on highways where there is little traffic and hardly any reflective radar targets.

Although in exceptional cases it may happen that actual blinding of the radar sensor has occurred in such situations and then the ACC system will fail to respond to the approach of a vehicle traveling in front at a lower speed, in practice this will not result in any impairment of driving safety because the ultimate responsibility for control of the vehicle still always lies with the driver, and the driver is compelled at any rate to keep his eye on the lane in front of his vehicle if for no other reason than to remain in the proper lane, so that obstacles in front of him would not escape his notice.

With available ACC systems, a display is provided on the dashboard of the vehicle, informing the driver either by lighting up or by a color change in a symbolic display of a vehicle traveling in front that a relevant target object has been selected (following mode). In addition, this display also informs the driver of the selected length of the interval of time which determines the distance from the selected target object. Thus if the driver sees a vehicle emerge as traveling in front and does not receive a message via the display that a relevant target object has been selected, the driver is able to recognize on the basis of this circumstance that the distance sensor is blind long before the distance from the vehicle in front has declined to a critical level. In this way, the behavior of the system is transparent for the driver at all times.

The loss of convenience which results from an obstacle not being detected automatically in these rare cases is more acceptable for the driver—in particular in sparsely populated regions having a dry climate—than frequent system shutdowns because of presumed blinding of the sensor.

Figure 3:
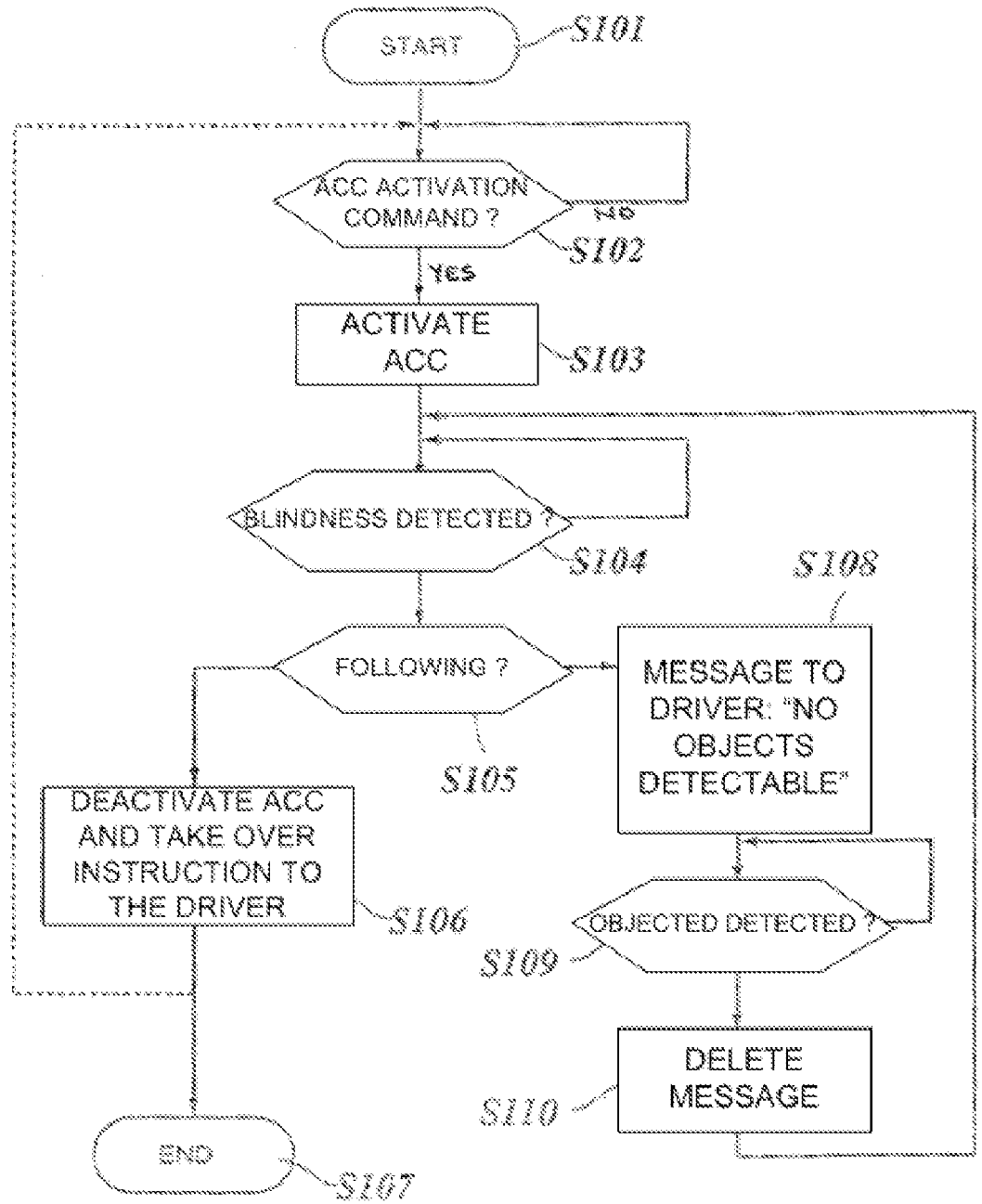
FIG. 3 shows a flow chart for another exemplary method of the present invention.

FIG. 3 shows a modified exemplary embodiment. After the system start (step S101), the system checks periodically in step S102 on whether the driver has issued an activation command. Following an activation command, the ACC system is activated in step S103. A periodic blindness check is then performed (step S104) during ongoing ACC operation, whether following or driving freely.

Only when a (presumed) blindness of the distance sensor has been detected is a differentiation performed in step S105 to ascertain whether the system is in following mode or in free driving mode. In following mode, the routine branches off to step S106, where the ACC system is deactivated and a takeover instruction is issued to the driver. As an example, FIG. 3 illustrates a variant in which the program is terminated (step S107) following this takeover instruction, so the driver does not have an opportunity to reactivate the ACC system before the next system start. Here again, however, there may optionally also be a jump back to step S102 after step S106, thus permitting reactivation of the ACC system.

If the free driving mode has been detected in step S105, there may be an immediate jump back to step S104. As a result, this would mean that the blindness detection is being ignored in free driving mode. In the example shown here, however, a few intermediate steps have been added in this branch. In step S108 the driver receives the message "no objects detectable" via the dashboard display. However, the system is not deactivated, so the cruise control function (regulation of speed at the desired speed) remains available. The only purpose of the message is to notify the driver as a precautionary measure that the distance sensor might be blinded, so that no vehicles traveling in front are detectable.

In step S109 a check is then performed periodically by ACC control unit 14 to determine whether the distance sensor has again detected an object. If this is the case, this means that in reality the sensor was not blinded but instead the presumed blindness detection is attributable only to an absence of reflective objects. In this case the message (step S108) is deleted in step S110 and the routine jumps back to step S104, continuing with normal cruise control.

Figure 4:
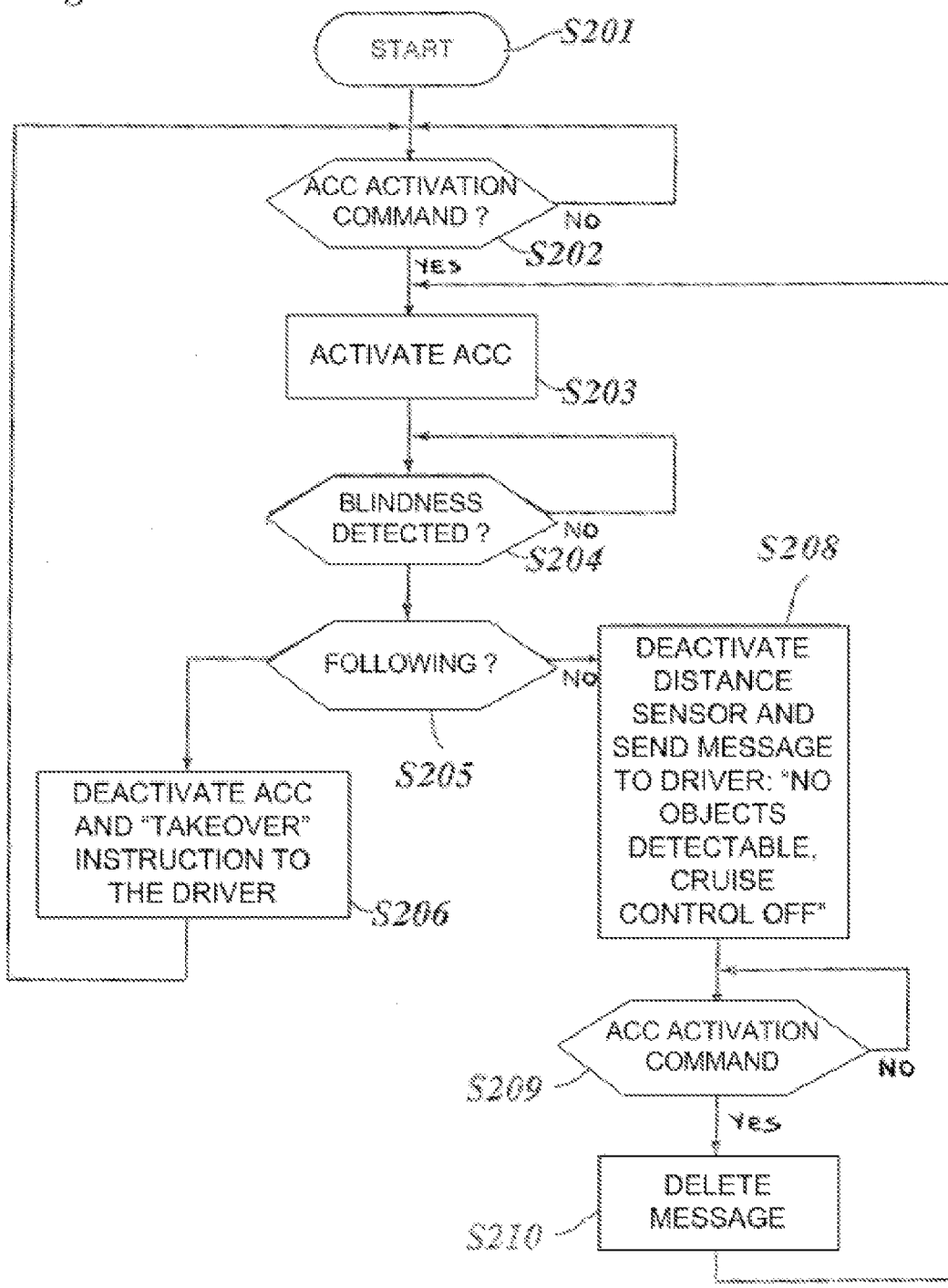
FIG. 4 shows a flow chart for another exemplary method of the present invention.

FIG. 4 shows a modification of the method according to FIG. 3. Steps S202 to S206 correspond to steps S101 to S106 in FIG. 3. After detecting blindness in step S204 and detecting the "free driving" mode in step S205, the driver here receives the message "no objects detectable, distance control off" in step S208. This indicates to the driver that only the cruise control set at the desired speed remains active, but the distance control for following mode is not automatically resumed even when new objects are detected. Instead, in step S209 a check is again performed to determine whether the driver has entered a command for (complete) reactivation of the ACC system. Only following such a driver command is the message (step S208) deleted in step S210, with the routine jumping back to step S203, where the activation command is executed. The system remains in the active mode if radar targets are again detected in the meantime. Otherwise step S205 is run through again and there is either a switch to inactive mode (S206) or a switch to partially active mode (S208) in which the cruise control remains active but the distance control is deactivated. Even in the inactive mode, the driver is able to reactivate the ACC system via an activation command (checked in step S202).

Figure 5:
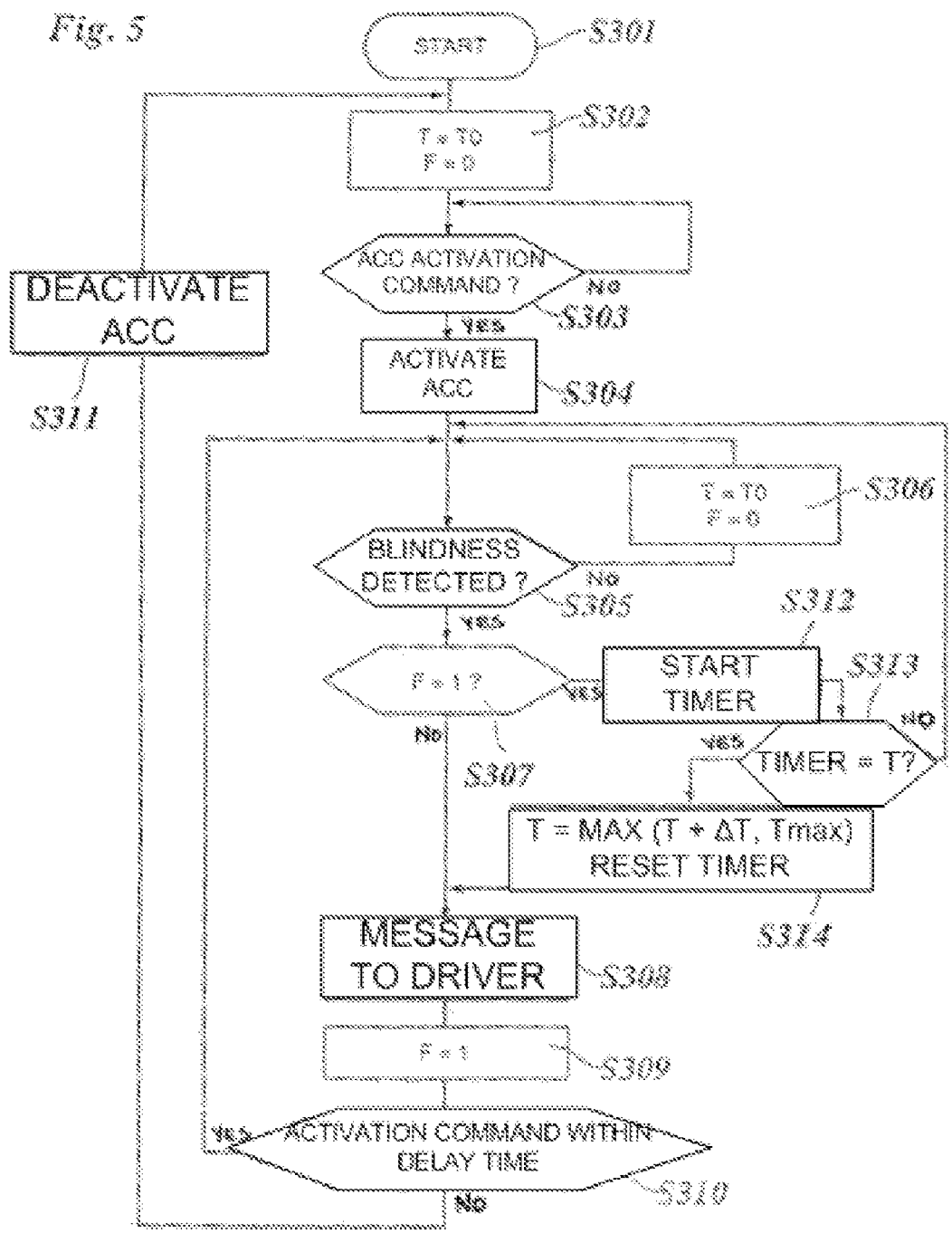
FIG. 5 shows a flow chart for another exemplary method of the present invention.

FIG. 5 shows an embodiment in which the choice between the active and inactive mode of the ACC system is not based on a distinction between free driving and following, but instead on the driver's behavior.

After system start in step S301, initialization is performed in step S302 with a waiting time T being set at value T0 and a flag F being set at value 0. In step S303 the activation command is checked and in step S304 the ACC system is activated if necessary.

With ongoing operation of the cruise control system, the blindness check is performed in step S305, and if no blindness of the sensor is detected waiting time T and flag F (in the event they have changed in the meantime) are reset in step S306 to initial value T0 and 0, respectively, before repeating the blindness check in step S305.

If the blindness of distance sensor 12 is recognized in step S305, then a check is performed in step S307 to determine whether flag F has a value of 1. Since this flag was initialized at 0, the result of this query will be negative in the first cycle. In step S308 a message is then output to the driver, instructing the driver that the ACC system will be deactivated again because of presumed blindness of the distance sensor. Following that, flag F is set at value 1 in step S309. In step S310, after waiting a certain time lag, a check is performed to determine whether the driver has reentered the activation command within this time lag. If this is not the case, the ACC system is deactivated in step S311 and the routine jumps back to step S302, so the driver may reactivate the system after reinitialization (in step S303).

However, if the driver enters the activation command within the time lag in step S310, he is thus giving notice that he considers the blindness detection to be incorrect and would like to resume the active state of the ACC system. The routine then jumps back to step S305 and the blindness check is repeated.

If there has been no change in ambient conditions in the meantime, the blindness of the sensor will be recognized again. However, the check in step S307 will now have a positive outcome because flag F has been set at 1 in step S309. In step S312, a timer is then started (if it is not already running). A check is performed in step S113 to determine whether waiting time T, which initially had a value of T0 because of the initialization, has elapsed since the start of the timer. In a waiting loop of length T, steps S304 and S307 are repeated. If an object is detected again, the routine exits from the waiting loop at step S306. Otherwise, waiting time T is increased by a certain increment ΔT after the waiting time has elapsed in step S314 but only up to a maximum Tmax. The timer is reset. Steps S308, S309 and S310 are run through again. Step S309 remains ineffective, however, because flag F already has a value of 1.

The renewed blindness detection in step S305 thus does not result in immediate output of the message in step S308 in this cycle and instead this message is output only after waiting time T has elapsed. The system thus remains active for the duration of waiting time T and only thereafter, if the blinding of the sensor persists, is the driver again presented with the choice in steps S308 through S310 as to whether he wants to allow the system to shut down because of presumed blindness or whether he wants to continue to keep it active.

If the driver opts for the latter alternative, the routine again jumps back to S305 and the waiting loop in step S306 is again run through but with a longer waiting period of T+ΔT.

This cycle may be run through multiple times, waiting time T during which the system remains active becoming longer by increment ΔT each time until reaching maximum value Tmax. In this way, the driver is able to keep the system in the active mode with relatively rare intervention measures (renewed input of the activation command in step S310).

If it is ascertained at some time in step S305 that the distance sensor is no longer blind, then by resetting waiting time T and flag F in step S306, the "memory" of the prior event is deleted and the system again behaves as if it were in the initial state. Renewed detection of blindness would then again result in immediate output of a message in step S308. Optionally, however, step S306 may also be omitted, so that the waiting times until the end of the trip are increased again and/or remain at the maximum value. In this case the driver will be burdened less frequently by messages in step S308 if radar targets are detected sporadically.

The embodiment shown in FIG. 5 requires occasional intervention on the part of the driver in the form of entry of the activation command in step S310, but this command need be entered only at relatively long intervals due to the "learning ability" of the system, with these intervals becoming longer and longer in the example presented here. The advantage of this embodiment is that the blindness detection is not ignored completely even with an extended period of free driving in a low-reflection environment. The time lag built into step S310 has the advantage that the driver does not become irritated due to immediate cessation of cruise control with the very first detection of blindness or due to the associated implausible deceleration of the vehicle but instead the driver is in a position to prevent such deceleration of the vehicle by promptly entering the reactivation command.

In the example shown here, waiting time T shows a linear increase corresponding to constant increment ΔT, but embodiments in which the waiting time increases progressively or according to any other curve are also conceivable. The length of the waiting time may optionally also depend on how frequently radar targets have been detected in the past. A low detection frequency indicates a low-reflection environment, so the waiting time should be lengthened.

The embodiment according to FIG. 5 may also be combined with the embodiments described previously, so there is immediate deactivation of the ACC system in following mode, whereas the procedure according to steps S307 through S314 is run through in free driving mode.

A detection check may of course also be performed according to step S2 following the system start in the exemplary embodiments according to the FIGS. 3 through 5. It is also self-evident that the driver has the opportunity to deactivate the ACC system by a shutdown command at any time. However, this is not shown in the flow charts for reasons of simplicity. Azimuth reflection.

What is claimed is:

1. A method for selecting an operating state of a cruise control system for a motor vehicle having a distance sensor and automatic blindness detection, the method comprising:
    checking, for automatic shutdown of the cruise control in the event of blindness of the distance sensor, at least one additional condition;
    performing the shutdown only if the at least one additional condition is met; and
    selecting, if no other one of the at least one condition is met when blindness of the distance sensor is detected, a partially active operating state in which the cruise control remains active at a desired speed selected by the driver, wherein a distance control based on signals of the distance sensor is activatable again only by a command by the driver.

2. The method of claim 1, wherein at least one of the at least one additional condition includes the fact that a detection of the blindness of the distance sensor is immediately preceded by a "following" mode in which a vehicle traveling in front is selected as a target object and a distance from the target object is regulated.

3. The method of claim 1, further comprising:
    outputting a message to the driver, when the blindness of the distance sensor is detected and no other one of the at least one condition is met so that the cruise control is continued, to instruct the driver of a possible blindness of the distance sensor.

4. The method of claim 3, wherein the message includes a visual display and is deleted automatically when the distance sensor detects new objects and the blindness detection system finds that there is no blindness of the distance sensor.

5. A method for selecting an operating state of a cruise control system for a motor vehicle having a distance sensor and automatic blindness detection, the method comprising:
    checking, for automatic shutdown of the cruise control in the event of blindness of the distance sensor, at least one additional condition, wherein at least one of the at least one additional condition is that when blindness is detected, the blindness detection is the first blindness detection to occur within a certain period of time; and
    performing the shutdown only if the at least one additional condition is met.

6. The method of claim 5, wherein if a current blindness detection is not the first time that the blindness has been detected, the cruise control is shut down only after a certain waiting time has elapsed since the current blindness detection, during which time the blinding of the distance sensor persists.

7. The method of claim 6, wherein the waiting time is variable as a function of at least one of a frequency of reactivation commands by the driver and a frequency of detection of target objects by the distance sensor.

8. The method of claim 5, wherein at least one of the at least one additional condition includes the fact that a detection of the blindness of the distance sensor is immediately preceded by a "following" mode in which a vehicle traveling in front is selected as a target object and a distance from the target object is regulated.

9. The method of claim 5, further comprising:
    outputting a message to the driver, when the blindness of the distance sensor is detected and no other one of the at least one condition is met so that the cruise control is continued, to instruct the driver of a possible blindness of the distance sensor.

10. The method of claim 9, wherein the message includes a visual display and is deleted automatically when the distance sensor detects new objects and the blindness detection system finds that there is no blindness of the distance sensor.

11. A cruise control system for a motor vehicle, comprising:
    a distance sensor;
    a control unit to regulate a speed of the vehicle as a function of a distance from a vehicle traveling in front, the distance being measured by the distance sensor, or, if no vehicle traveling in front is detected, to regulate the speed to a desired speed selected by the driver, by performing the following:
    checking, for automatic shutdown of the cruise control in the event of blindness of the distance sensor, at least one additional condition,
    performing the shutdown only if the at least one additional condition is met, and selecting, if no other one of the at least one condition is met when blindness of the distance sensor is detected, a partially active operating state in which the cruise control remains active at a desired speed selected by the driver, wherein a distance control based on signals of the distance sensor is activatable again only by a command by the driver.

12. A cruise control system for a motor vehicle, comprising:
a distance sensor;
a control unit to regulate a speed of the vehicle as a function of a distance from a vehicle traveling in front, the distance being measured by the distance sensor, or, if no vehicle traveling in front is detected, to regulate the speed to a desired speed selected by the driver, by performing the following:
checking, for automatic shutdown of the cruise control in the event of blindness of the distance sensor, at least one additional condition, wherein at least one of the at least one additional condition is that when blindness is detected, the blindness detection is the first blindness detection to occur within a certain period of time, and
performing the shutdown only if the at least one additional condition is met.

* * * * *